US005600558A

United States Patent [19]

Mearek et al.

[11] Patent Number: 5,600,558

[45] Date of Patent: Feb. 4, 1997

[54] DATA EXCEPTION REPORTING SYSTEM

[75] Inventors: Ronald J. Mearek, Peoria; David L. Dickrell, Chillicothe; Gregory S. Gauger, Pekin; Robert W. Keene, Peoria; Richard D. Rathe, Peoria; Brian T. Rolli, Peoria; Greg A. Schumacher, Washington; Scott G. Sinn, Morton; Michael R. Verheyen, Dunlap, all of Ill.

[73] Assignee: Caterpillar Inc., Peoria, Ill.

[21] Appl. No.: 289,470

[22] Filed: Aug. 12, 1994

[51] Int. Cl.[6] ............................ G06F 17/00; G06F 15/04

[52] U.S. Cl. ............................ 364/424.04; 364/424.034; 340/438

[58] Field of Search ........................ 364/424.04, 424.03, 364/550, 551.01; 340/438, 439

[56] References Cited

U.S. PATENT DOCUMENTS

| | | | |
|---|---|---|---|
| 3,828,742 | 8/1974 | Weis | 123/102 |
| 4,368,705 | 1/1983 | Stevenson et al. | 123/357 |
| 4,521,885 | 6/1985 | Melocik et al. | 371/29 |
| 4,608,638 | 8/1986 | Tsikos | 364/424.04 |
| 4,613,939 | 9/1986 | Paine | 364/424 |
| 4,853,856 | 8/1989 | Hanway | 364/424.04 |
| 4,858,133 | 8/1989 | Tekeuchi et al. | 364/424.04 |
| 4,926,331 | 5/1990 | Windle et al. | 364/424.04 |
| 4,939,652 | 7/1990 | Steiner | 364/424.04 |
| 4,949,263 | 8/1990 | Jurca | 364/424.04 |
| 4,987,541 | 1/1991 | Levente et al. | 364/424.04 |
| 5,033,010 | 7/1991 | Lawrence et al. | 364/424.04 |
| 5,173,856 | 12/1992 | Purnell et al. | 364/424.04 |
| 5,305,216 | 4/1994 | Okura et al. | 364/424.04 |
| 5,305,219 | 4/1994 | Ishibashi et al. | 364/424.04 |
| 5,311,430 | 5/1994 | Ishigami | 364/424.04 |
| 5,325,082 | 6/1994 | Rodriguez | 364/424.04 |
| 5,350,076 | 9/1994 | Kalan | 364/424.04 |
| 5,446,659 | 8/1995 | Yamawaki | 364/424.04 |
| 5,450,321 | 9/1995 | Crane | 364/424.04 |
| 5,479,350 | 12/1995 | Barakchi et al. | 364/424.04 |

*Primary Examiner*—Vincent N. Trans
*Attorney, Agent, or Firm*—Stephen L. Noe

[57] ABSTRACT

A system for controllably sensing, recording, and selectively displaying data associated with operational characteristics of a vehicle is described. A plurality of transducers are connected to a programmable logic device along with data entry, data storage, and data display devices. Information received from the transducers is processed by the logic device to determine whether a certain operational characteristic has occurred during the time that certain other characteristics are present. In addition, the amount of time that the particular characteristic occurs is determined.

7 Claims, 5 Drawing Sheets

DATA EXCEPTION REPORTING SYSTEM

TECHNICAL FIELD

This invention relates generally to an apparatus and method for displaying data associated with preselected operational characteristics of a vehicle and associated engine and, more particularly, to an apparatus and method for controllably sensing, recording, and displaying such data.

BACKGROUND ART

Many vehicles and engines associated with vehicles in use today include computerized information and control systems. Such systems typically include a variety of sensors positioned about the vehicle and engine to sense various operating conditions and to develop corresponding electrical signals. These signals are delivered to a control computer or logic device where they are utilized in a controllable and programmable manner to affect the operation of the vehicle and associated engine. Such engine controls are relatively common in the case of modern vehicles, both on and off road.

It is often useful for one interested in data accumulated by a control device of the type described above to have the ability to capture particular data elements having a predetermined association one with the other. For example, the user of such a system might want to know how many miles a vehicle is driven under particular speed and temperature conditions.

The present invention is directed to overcoming one or more of the problems as set forth above.

DISCLOSURE OF THE INVENTION

In one aspect of the present invention an apparatus for controllably sensing, recording, and selectively displaying data associated with preselected operational characteristics of a vehicle and associated engine is provided. The apparatus includes a programmable logic device having connected to it a data entry device. A plurality of transducers are respectively connectable to the logic device and are adapted to produce responsive parameter signals. A storage device and a display device are each connectable to the logic device. The parameter signals are received by the logic device and controllably manipulated to produce responsive information signals. The logic device controllably accumulates the amount of time a preselected one of the information signals occurs during a period defined by at least a preselected one of the remaining information signals having a predetermined value, the accumulated time being delivered to the storage device and being controllably deliverable to the display device.

In a second aspect of the present invention, a method for controllably sensing, recording, and selectively displaying data associated with operational characteristics of a vehicle and associated engine having a plurality of transducers respectively connectable to a programmable logic device and adapted to produce parameter signals in response to respective preselected engine and vehicle parameters is provided. The apparatus includes a storage device connected to the logic device as well as data entry and display devices. The method includes the steps of controllably manipulating the parameter signals to produce responsive information signals and accumulating the amount of time a preselected one of the information signals occurs during a period defined by at least a preselected one of the remaining information signals having a predetermined value. The accumulated time value is delivered to the storage device and is controllably deliverable to the display device.

The present invention provides a system for selectively and controllably causing desired data to be accumulated in a fashion controlled by other sensed or calculated parameters. Therefore, customized information can be obtained from the data exception recording system.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
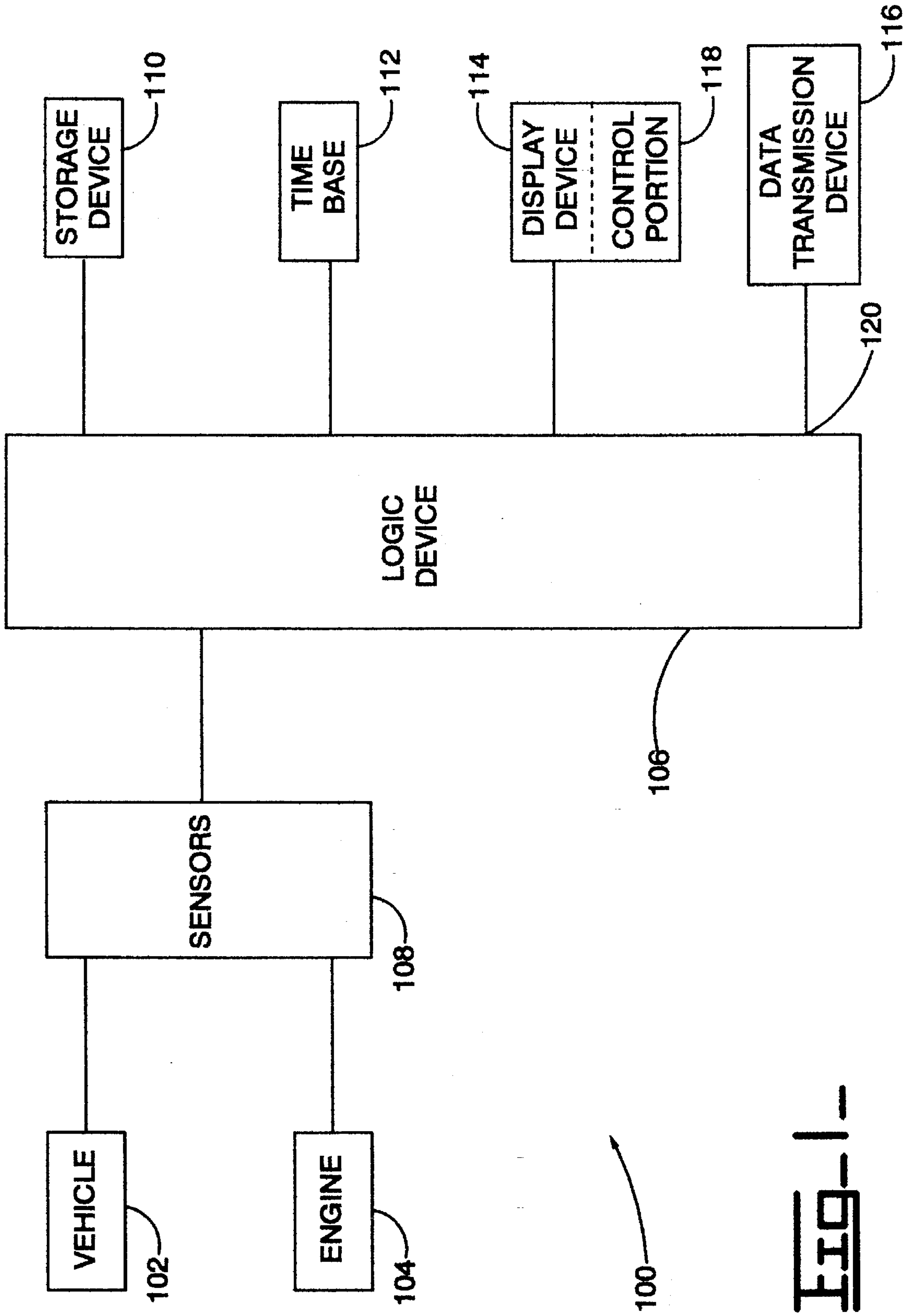
FIG. 1 is a block diagram of one embodiment of the present invention.

Referring first to FIG. 1, an apparatus embodying certain of the principles of the present invention is generally indicated by the reference numeral 100. It should be understood that the following detailed description relates to the best presently known embodiment of the apparatus 100. However, the apparatus 100 can assume numerous other embodiments, as will become apparent to those skilled in the art, without departing from the appended claims.

In FIG. 1, the apparatus 100 is adapted to controllably sense, record, and selectively display data associated with operational characteristics of a vehicle 102 and associated engine 104. The apparatus 100 includes a programmable logic device 106 and a plurality of transducers 108 respectively connectable to the programmable logic device 106. Each transducer 108 is adapted to produce parameter signals responsive to respective preselected engine and vehicle parameters. A storage device 110 and a local display device 112 are each connected to the programmable logic device 106. The apparatus 100 also includes a time base 114 associated with the programmable logic device 106 and a data transmission device 116 likewise associated with the logic device 106.

The parameter signals produced by the transducers 108 are received by the programmable logic device 106 and controllably manipulated to produce predetermined information signals. The information signals are delivered to the storage device and each signal is individually accumulated in the storage device 110 during a predetermined period.

Figure 2:
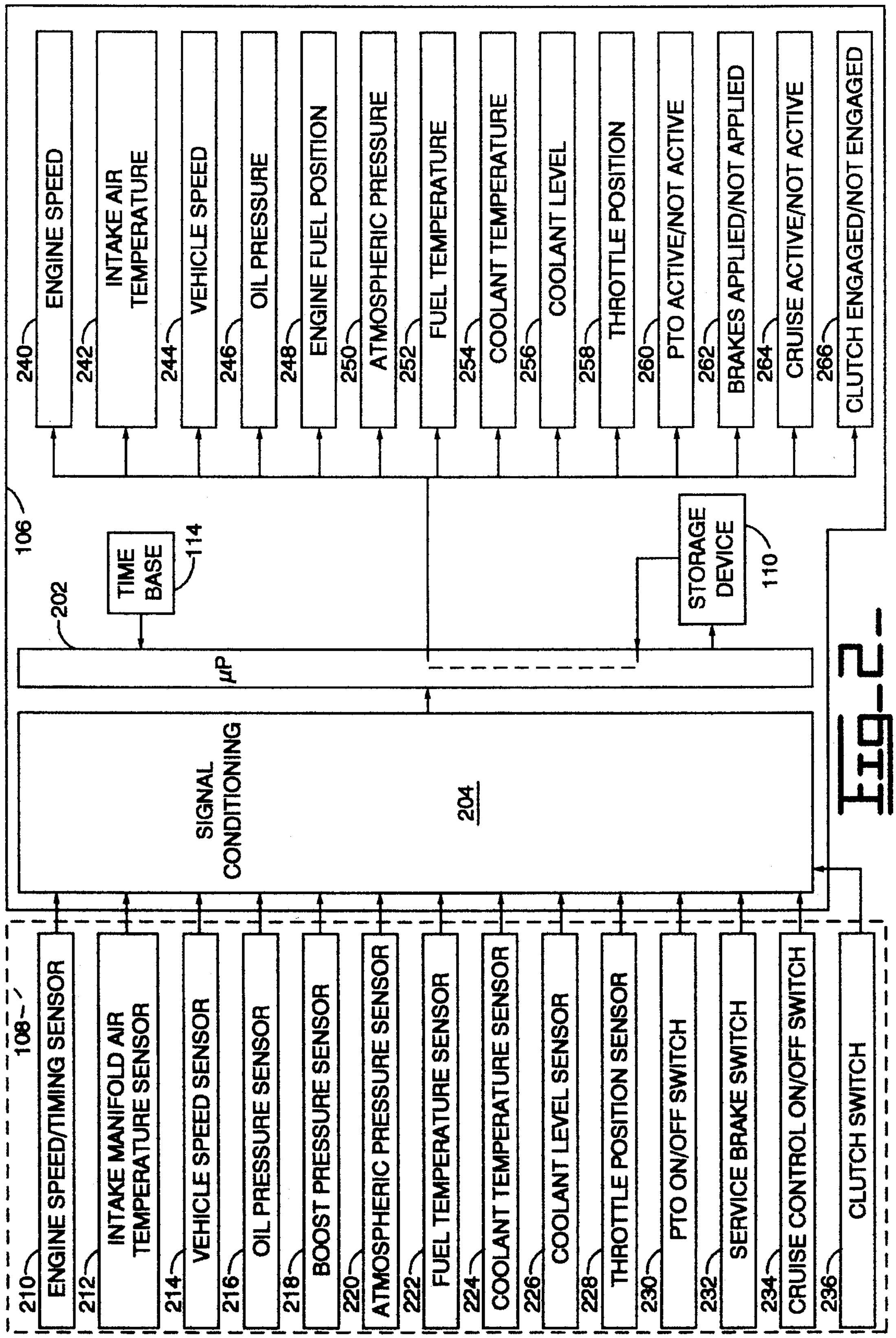
FIG. 2 is a more detailed block diagram of a logic device and a plurality of sensors associated with one embodiment of the present invention.

In FIG. 2, a more detailed view of some of the elements shown in FIG. 1 is set forth. FIG. 2 illustrates the programmable logic device 106 including a microprocessor 202, and the plurality of signal conditioning elements 204 associated with the processor 202. The plurality of transducers 108 are connected to the logic device 106 through the signal conditioning element 204. In a preferred embodiment of the apparatus 100, the transducers 108 include the following individual elements: engine speed/timing sensor 210, intake manifold air temperature sensor 212, vehicle speed sensor 214, oil pressure sensor 216, boost pressure sensor 218, atmospheric pressure sensor 220, fuel temperature sensor 222, coolant temperature sensor 224, coolant level sensor 226, throttle position sensor 228, PTO on/off switch 230, service brake switch 232, cruise control on/off switch 234, and clutch switch 236.

The parameter signals produced by the plurality of transducers 108 are processed by the microprocessor 202 to produce responsive information signals. In a preferred embodiment of the present invention, the information signals responsive to the sensors 210–236 include engine speed 240, intake air temperature 242, vehicle speed 244, oil pressure 246, engine fuel position 248, atmospheric pressure 250, fuel temperature 252, coolant temperature 254, coolant level 256, throttle position 258, PTO active/not active 260, brakes applied/not applied 262, cruise active/not active 264, and clutch engage/not engage 266.

The storage device 110 is connected to the microprocessor 202 of the programmable logic device 106. In the preferred embodiment, the storage device 110 is a form of random access memory. In a preferred embodiment of the apparatus 100, the random access memory can include both volatile and non-volatile memory elements enabling it to store both transitional and static data.

Referring again to FIG. 1, the local display device 112 includes a control portion 118. The control portion 118 of the display device 112 is, for example, an alphanumeric keyboard of the type commonly associated with microcomputers. The control portion 118 could also be a more simple keyboard device or could even be voice actuated or otherwise amenable to the provision of control signals in response to manual input. Likewise, the display device 112 in the preferred embodiment is a CRT or liquid crystal display device capable of portraying alphanumeric information. However, this too could be any suitable display device including a paper based printer or an audible voice synthesis device.

Also, as shown in FIG. 1, the data transmission device 116 is connected through a communication port 120 to the programmable logic device 106. The data transmission device 116 is of common design and is sufficient to deliver selected ones of the information signals to a remote location. For example, the data transmission device could be a radio radiating standard radio signals, or a microwave, infrared, or other type transmission device, and can include satellite link capability. Various types of data transmission devices are well known in the art of communicating signals to remote locations and any suitable device is anticipated to be useable with the apparatus 100.

Also, in a preferred embodiment of the apparatus 100, access to and manipulation of or removal of the information signals accumulated in the storage device 110 is controllably restricted utilizing one or more levels of password protection. Again, the use of password protection for restricting access to data elements in a computerized system is well known in the art.

The parameter signals received by the programmable logic device 106 which are used to produce responsive information signals are accumulated as information signals by accumulating the amount of time a preselected one of the information signals occurs during a period defined by a preselected one of the remaining information signals having a predetermined value. This accumulated time value is delivered to the storage device and is controllably deliverable to the display device.

In other words, the data exception reporting system can be programmed to continually monitor the operating characteristics of the vehicle and engine and to accumulate information only when certain combinations of characteristics are present. For example, it might be desirable to know how many hours the engine is operated in a certain RPM range, or in a certain RPM range at a particular air temperature. It might be desirable to know how much fuel is consumed while the vehicle is being operated at a certain speed, or at a certain percentage of throttle application. It might be desirable to know how many miles the engine is driven with the coolant temperature at a certain level. Such combinations of sought values in conjunction with predetermined operating characteristics can be of great value in interpreting the way a vehicle or engine is operated and in accounting for problems such as low fuel economy or high engine wear that might be encountered. Therefore, the preferred embodiment of the program described below is designed to monitor either one or two operating characteristics or parameters and to accumulate the time that the characteristic takes place during particular ranges of other parameters.

It should be noted that the parameters selected for inclusion in the following system are those utilized in a preferred embodiment of the invention. However, other similar systems might benefit from the accumulation of different desired information based on different selected parameters. The instant invention is of a sufficiently general nature to accommodate such obvious variations.

Figure 3A:
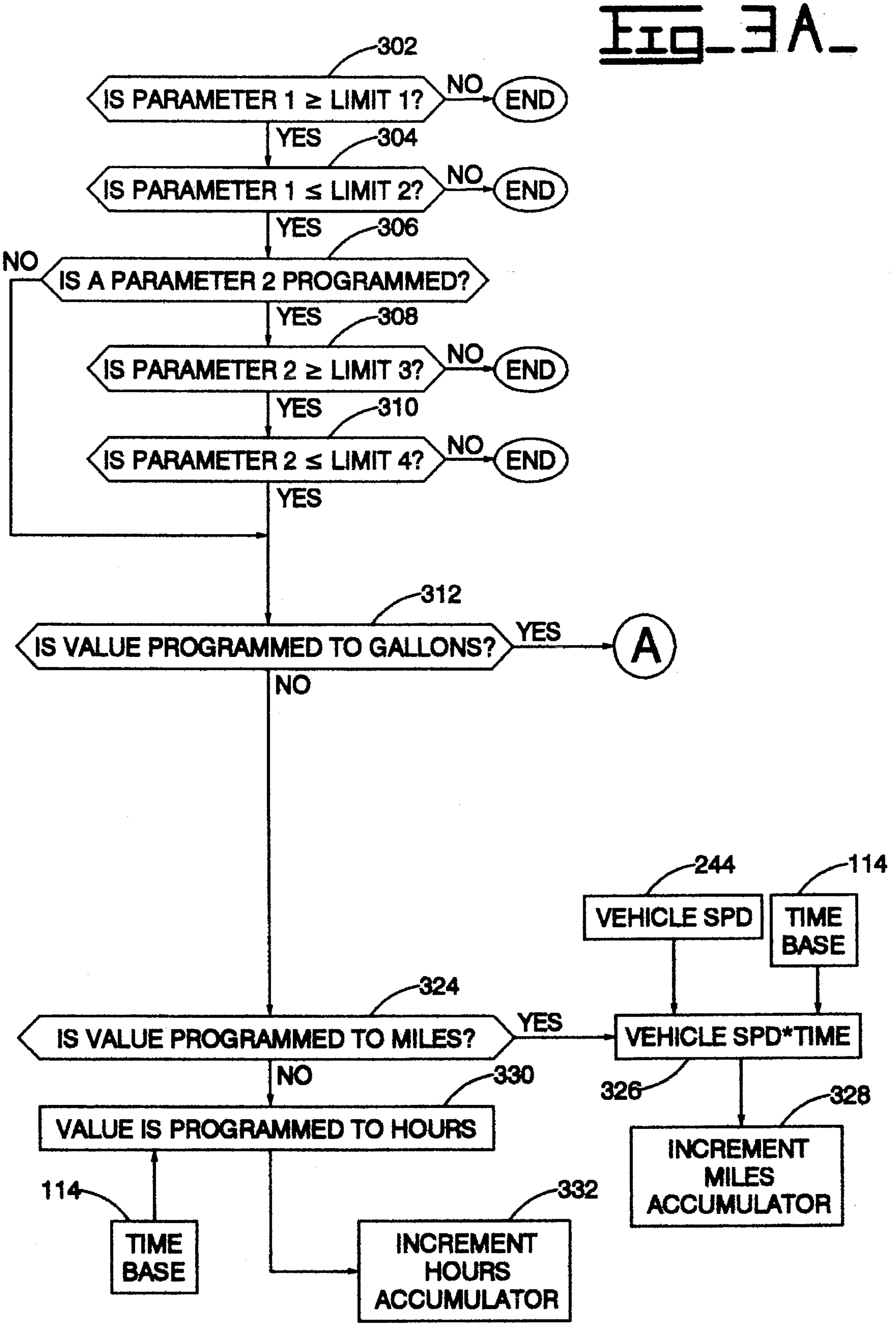
FIGS. 3A and 3B are flowcharts of software used with the described embodiment of the present invention.
Figure 3B:
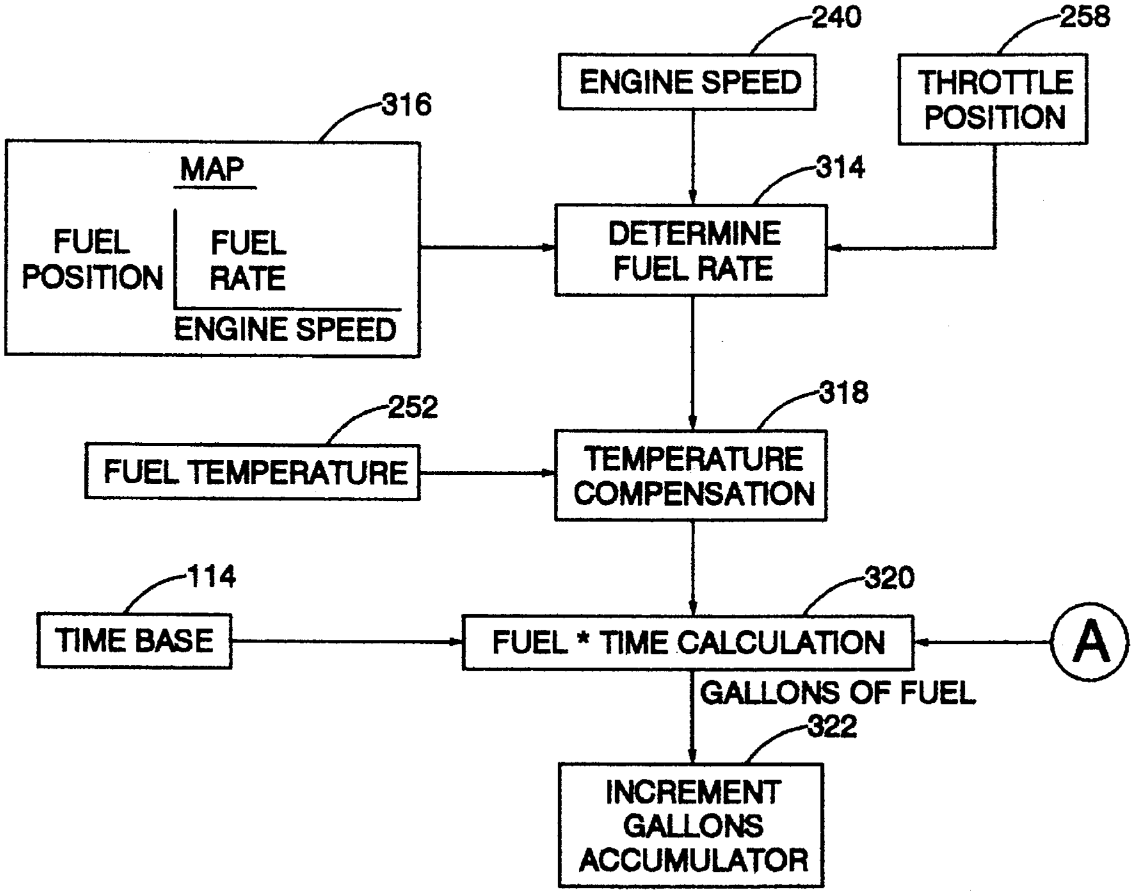

FIG. 3 is a flowchart illustrating a computer software program for implementing the preferred embodiment of the present invention. The program depicted in this flowchart is particularly well adapted for use with the microcomputer and associated components described above, although any suitable microcomputer may be utilized in practicing an embodiment of the present invention. This flowchart constitutes a complete and workable design of the preferred software program, and has been reduced to practice on a microcomputer system. The software program may be readily coded from this detailed flowchart using the instruction set associated with any suitable conventional microcomputer. The process of writing software code from a flowchart such as this is a mere mechanical step for one skilled in the art.

FIG. 3 depicts the flowchart for the software necessary to program the data exception reporting system or the apparatus 100. The logic asks in block 302 if a first parameter is greater than or equal to a preset limit. If not, the module ends. However, if it is then the parameter value is interrogated in the block 304 to see if it is less than or equal to a prescribed upper limit. If not, again the program ends. However, if the first parameter is within the range set by the two limits the program then goes to the block 306 to determine if a second parameter is of concern. If not, the blocks 308 and 310 are skipped. However, if a second parameter is at issue, it is determined whether or not it is within the range of blocks 308 and 310. If not, the program again ends. However, if all of the variables are satisfied, control passes to the block 312.

At the block 312 it is determined whether the value being sought is gallons of fuel. If so, a calculation is performed to determine how many gallons of fuel are consumed during the time that the parameters are within the desired range. This is done at the block 314, which receives information about engine speed from the block 240 and engine throttle position from the block 258. These parameters are used in conjunction with a map 316 to determine the instantaneously fuel consumption rate. This signal is then processed by the block 318 which accepts the fuel temperature from the block 252 and compensates the fuel rate for the temperature. The compensated fuel rate is then delivered to the block 320 where it is multiplied by the amount of time that the parameters are in a particular range from the time base 114, producing gallons of fuel consumed while the parameters are as required. The total gallons of fuel are then used to increment the gallons accumulator at the block 322 and stored in the storage device 110.

If the value being sought was not gallons in the block 312, at the block 324 it is determined whether the value was miles. If so, at the block 326 the vehicle speed from the block 244 and the time from the time base 114 are multiplied to determine the total number of miles traveled while the parameters are as set forth above. This information is delivered to the miles accumulator at the block 328 and stored in the storage device 110.

Finally, if the value programmed was not miles at the block 324 it is checked at the block 330 to determine if it is programmed to hours. Since that is the only remaining possible value in the example set forth in the preferred embodiment, the number of hours as determined from the time base 114 is accumulated in the time accumulator 332 and stored in a storage device 110.

INDUSTRIAL APPLICABILITY

The instant invention is most effectively used as a system for determining how a vehicle and associated engine are operated on a particular job or by a particular operator. For example, the owner, fleet manager, or maintenance personnel can controllably program the apparatus 100 to collect particular desired information in response to the occurrence of preselected operating conditions.

Figure 4:
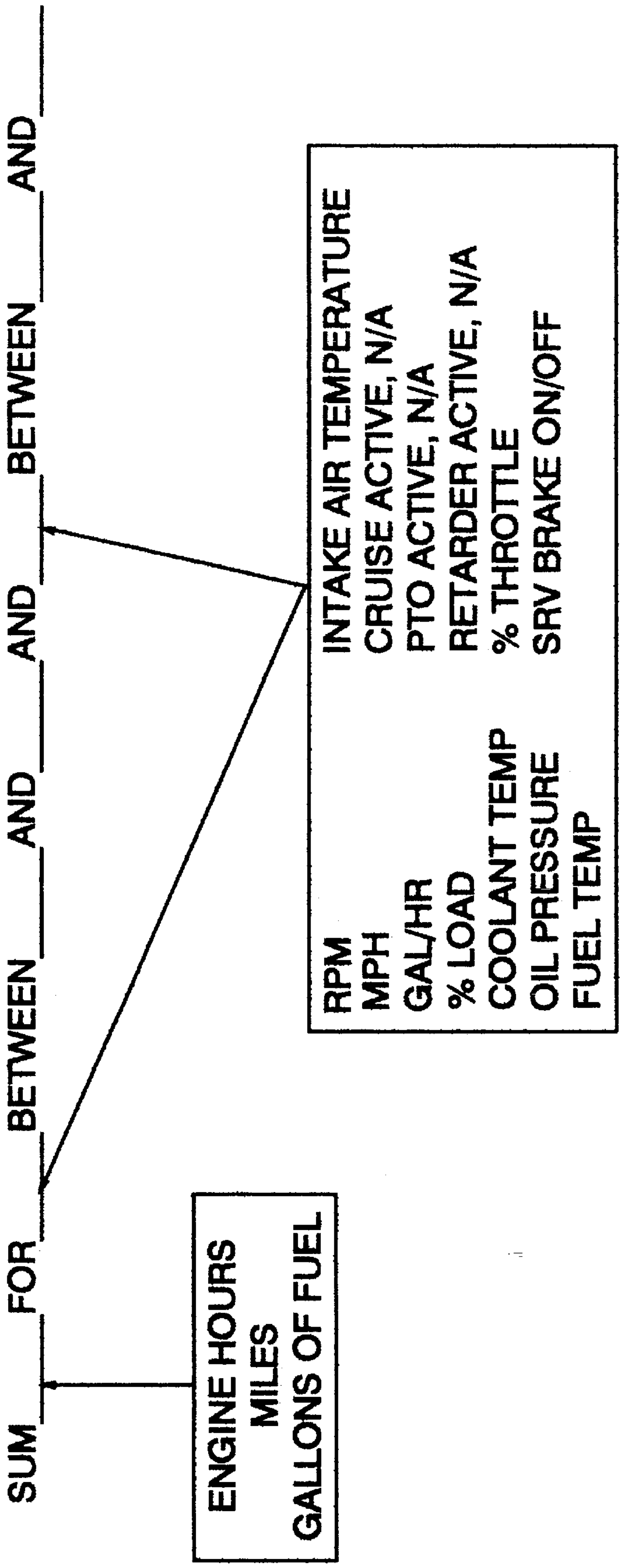
FIG. 4 is a stylized representation of the data entry system associated with an embodiment of the present invention.

Programming would typically be done utilizing the control portion 118 associated with the display device 112. In the preferred embodiment, this would entail the use of a service tool or microcomputer. The microcomputer or similar service tool would be plugged into a suitable port of the apparatus 100 for communication with the logic device 106. Preestablished formula structures as described previously with respect to FIG. 3 would allow a fill-in-the-blank type operation as described in FIG. 4. The preferred embodiment of the instant invention would allow up to five independent programmed events to be tracked. Of course, this is an arbitrary number and could be increased or decreased in accordance with a desired operation of the apparatus 100.

Once the custom program was implemented and stored by the logic device 106 in the storage device 110, the vehicle and engine would simply be put into service for a desired period of time. At the end of this service period, the display device 112 would again be connected to the logic device 106 and the resulting data received. Alternatively, the data could be transmitted by the data transmission device 116 to a remote location.

While a standard microcomputer type service tool is described as part of the preferred embodiment, other data entry and display devices would be equally suitable. For example, voice recognition and voice synthesis technology could be utilized in the programming and reporting function. Likewise, if the data transmission device 116 was bidirectional, the programming could take place from a remote location.

Other aspects, objects, advantages of this uses can be obtained from a study of the drawings, the disclosure, and the appended claims.

We claim:

1. An apparatus to controllably sense, record, and selectively display data associated with preselected operational characteristics of a vehicle and associated engine, comprising:

a programmable logic device;

a data entry device connectable to said programmable logic device;

a plurality of transducers respectively connectable to said programmable logic device and each adapted to produce parameter signals responsive to respective preselected engine and vehicle parameters;

a storage device connected to said programmable logic device;

a display device connectable to said programmable logic device; and, wherein said parameter signals are received by said programmable logic device and controllably manipulated by said programmable logic device to produce responsive information signals, and wherein said programmable logic device controllably accumulates the amount of time a preselected one of said information signals occurs during a period defined by at least a preselected one of said remaining information signals having a predetermined value, said accumulated time value being delivered to said storage device and being controllably deliverable to said display device.

2. An apparatus, as set forth in claim 1, wherein said preselected ones of said information signals are selectable by modifying said programmable logic device through said data entry device.

3. An apparatus, as set forth in claim 2, wherein selection of said preselected ones of said information signals and access to and alteration of said accumulated information signals stored in said storage device is controllably restricted using password protection.

4. An apparatus, as set forth in claim 1, including a communication port connected to said programmable logic device and a data transmission device connected to said communication port, said data transmission device being sufficient to deliver selected ones of said information signals to a remote location.

5. A method for controllably sensing, recording, and selectively displaying data associated with operational characteristics of a vehicle and associated engine having a plurality of transducers respectively connectable to a programmable logic device and adapted to produce parameter signals in response to respective preselected engine and vehicle parameters, and having a storage device connected to said programmable logic device and data entry and display devices connectable to said programmable logic device, comprising the steps of:

controllably manipulating said parameter signals to produce responsive information signals;

accumulating the amount of time a preselected one of said information signals occurs during a period defined by at least a preselected one of said remaining information signals having a predetermined value;

delivering said accumulated time value to said storage device; and, controllably delivering said accumulated time value to said display device.

6. A method, as set forth in claim 5, including the step of selecting said preselected ones of said information signals by modifying said programmable logic device through said data entry device.

7. A method, as set forth in claim 6, wherein selection of said preselected ones of said information signals and access to and alteration of said accumulated information signals stored in said storage device is controllably restricted using password protection.

* * * * *